United States Patent [19]
Mulder

[11] 3,899,244

[45] Aug. 12, 1975

[54] DEVICE FOR VIEWING UNDER WATER

[75] Inventor: Hendrik Mulder, Delft, Netherlands

[73] Assignee: N. V. Optische Industrie de Oude Delft, Delft, Netherlands

[22] Filed: Aug. 26, 1974

[21] Appl. No.: 500,588

[30] Foreign Application Priority Data
Sept. 7, 1973    Netherlands...................... 7312361

[52] U.S. Cl. ................. 351/43; 350/146; 350/179; 350/189
[51] Int. Cl.² ...................... G02C 1/00; G02B 3/04
[58] Field of Search ...... 351/43; 350/179, 189, 145, 350/146

[56] References Cited
UNITED STATES PATENTS
2,730,014   1/1956   Ivanoff et al..................... 351/43 X
3,320,018   5/1967   Pepke ............................ 350/179 X FOREIGN PATENTS OR APPLICATIONS
1,040,064   5/1953   France............................... 350/179
1,167,779   11/1958  France............................... 350/179

*Primary Examiner*—Paul A. Sacher
*Attorney, Agent, or Firm*—Arthur B. Colvin

[57] ABSTRACT

Device for viewing under water comprising two identical optical lens systems, each of the systems as seen from the object side to the image side consisting of a first component with a concave image-sided surface, an air space and a second component in the form of a lens of positive power, the image-sided nodal point of the first component substantially coinciding with the object-sided nodal point of the second component, the total dioptric power of each of the systems being substantially zero under water.

3 Claims, 4 Drawing Figures

DEVICE FOR VIEWING UNDER WATER

In known devices of this kind, see French Patent Specification no. 1.040.064, the optical axes of the optical lens systems are parallel.

It is an object of such devices to increase the field of view under water and to correct the distortion which is experienced under water. However it is a drawback of the known devices that the field of view is seriously limited at the one hand by the mounting parts of the optical lens systems and at the other by the fact that aberrations increase with an increasing angle between the line of view and the optical axes. In a non-complicated system for a diving mask, in which the first component and the second component preferably consist of one single optical element, e.g. made of plastic, said angle has a maximum value of 25°.

Assuming a fixed position of the point of rotation with respect to the optical axis of the optical system, which actually will be the case in a diving mask, in practical cases the field of view appears to be limited to 40°. A further drawback of known devices results from the fact that the distance between the axes of the two eyes is critical as the point of rotation of each of the eyes has to be positioned preferably on the optical axis of the related optical system.

It is the object of the invention to provide a device of the kind mentioned which does not show the above mentioned drawbacks.

According to the invention a device for observing under water of this kind is characterized in that the optical axes of the optical lens system converge towards the image-side and include an angle between 40° and 60° and in that one of the two components of each of the optical lens systems comprises an aspherical surface.

As a result of the convergence of the optical axes the mounting parts of the optical systems are partly positioned outside of the field of view, the possibility of observation of the right eye to the right and of the left eye to the left is extended to an angle of 45° with respect of the forward direction and the peripheral observation is increased to an angle of 90° with respect to the forward direction. The aspherical shape of a surface of one of the components results in viewing with very small optical aberrations in the forward direction and in (stereoscopic viewing) the overlapping area of the two eyes and in the possibility of a less critical positioning of the eyes with respect to the optical axis of its related optical system. The combination of the two measures according to the invention in optical systems for a diving mask result in a diving mask having under water in the horizontal plane a field of view of 40° in which stereoscopic viewing is possible, in a "sharp" field of view of about 90° and a peripheral field of view up till about 180°, for an observer with a distance between the eyes between 60 and 68 mm.

The invention will now be described more in detail by way of example only, with reference to the accompanying drawings, in which.

Figure 1:
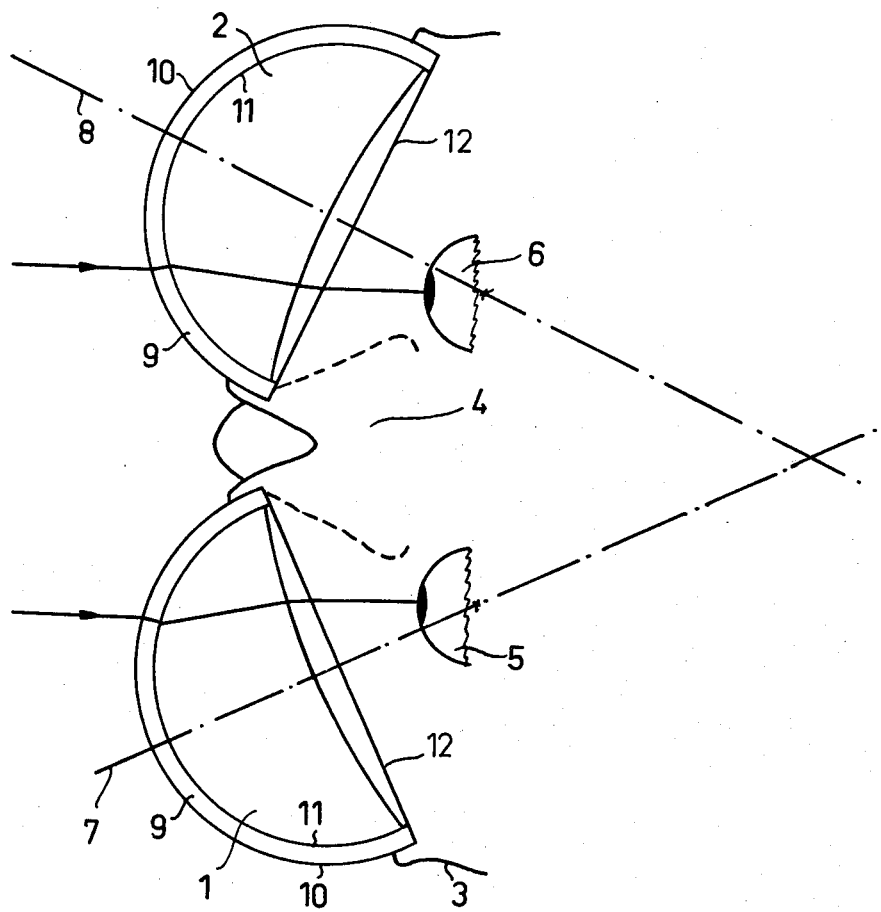
FIG. 1 shows schematically an embodiment of a device according to the invention in the form of a diving mask.

Referring to FIG. 1, two identical optical lens systems 1 and 2 are shown, both systems forming part of a device according to the invention, in this case a diving mask 3, which has been attached to the face of an observer, the observer's nose and eyes being shown at 4 and at 5, 6 respectively.

The optical lens sytems consist, as indicated at 9 in FIG. 1, of a first component I, e.g. made of plastic, with an object sided convex surface 10, and a concave image-sided surface 11, and of a second component II in the form of a lens with positive dioptric power, which is indicated at 12.

The optical axes 7 and 8 of the two optical lens systems include an angle of about 50°, that is the optical axis of each of the systems and the forward directions of each of the eyes include an angle of about 25°.

The space between the first and the second components contains dry air.

Figure 2:
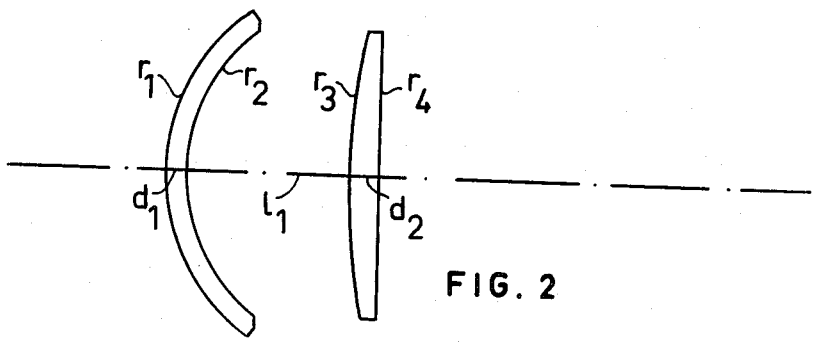
FIG. 2 shows schematically one of the two identical optical lens systems, which forms part of a device according to the invention.

In FIG. 2 one of the optical lens systems of the device according to FIG. 1 is shown. The optical lens system as shown forms part of a device comprising two of such optical lens systems and in which the optical axes converge towards the image-side and include an angle of about 50°.

Figure 3:
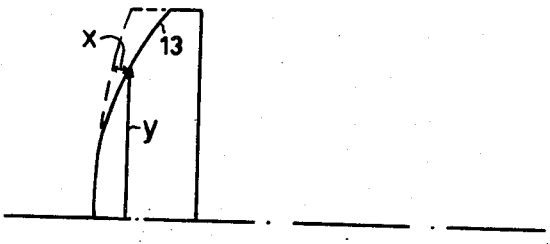
FIG. 3 shows a cross-section of an embodiment in which the second component is provided with an aspherical surface.

In FIG. 3 a cross-section of the second component provided with an aspherical surface according to a first embodiment of the invention is shown.

A device according to the invention comprising a second component, as shown in FIG. 3, is characterized in that the optical axes of the optical lens systems include an angle of 50°, the object-sided surface of the second component being aspherical, and in that each of the optical lens systems is determined by the following numerical data, in which the dioptric powers of the refractive surfaces may deviate by ± 5% of the total power,

| Comp. number | Radii of curvature in dm | Axial thickness or separation in dm | Refractive index |
|---|---|---|---|
| I | $r_1 = -0.4519$ | $d_1 = 0.0445$ | $n_d = 1.4926$ |
|   | $r_2 = -0.4074$ | $l_1 = 0.4074$ | |
| II | $r_3$ axis $= -0.7714$ | $d_2 = 0.0800$ | |
|   | $r_4 = \infty$ | | $N_d = 1.4926$ | the distance X in $10^{-1}$ M parallel to the optical axis between the actual surface and a spherical surface with radius of curvature $r_{3axis}$ on a height $y$ in $10^{-1}$ M for the object-sided surface of the second component being determined by the following equation:

$$x = 0.0239y^3 - 1.016y^4 + 13.50y^5 - 20.44y^6 - 663.35y^7 + 2952.92y^8 - 2782.51y^9 + 2325.41y^{10} - 16972.43y^{11}.$$

Figure 4:
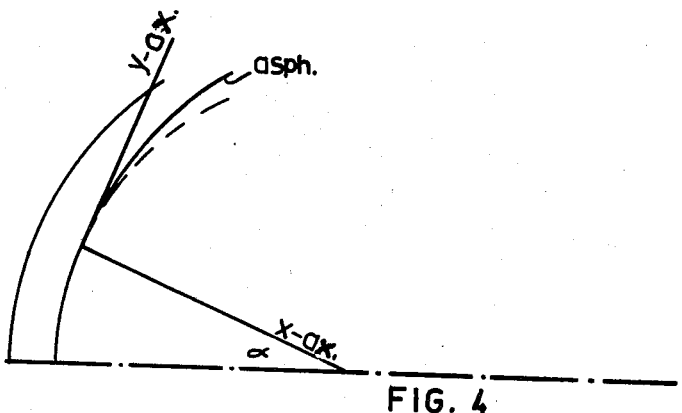
FIG. 4 shows a cross-section of an embodiment in which the first component is provided with an aspherical surface.

A device according to the invention comprising a first component as shown in FIG. 4, is characterized in that the optical axes of the optical lens systems include an angle of 50°, the image-sided surface of the first component having a aspherical rim, which rim as measured from the optical axes starts under an angle α = 33° 22'44", and in that each of the optical systems is determined by the following numerical data, in which the dioptric surfaces of the refractive powers may deviate by ± 5% of the total power,

| Comp. number | Radii of curvature in mm | Axial thickness or separation in mm | Refractive index |
|---|---|---|---|
| I | $r_1=-45.19$ | | |
| | $r_{2axis}=-40.74$ | $d_1=4.45$ | $n_d=1.4926$ |
| | | $l_1=40.74$ | |
| II | $r_3=-77.14$ | | |
| | $r_4=\infty$ | $d_2=8.00$ | $n_d=1.4926$ | in which, as measured in a system of orthogonal axes, the x-axis of which coincides with the radius under an angle of 33° 22'44" and the y-axis of which contains the point of intersection of the radius under an angle of 33° 22'44" and the image-sided surface of the first component, the distance $x$ in mm between the aspherical rim and the extension of the spherical surface on a height $y$ in mm is determined by the following equation:

$x = -0.6503y^3 + 83.4008y^4 - 1858.7277y^5 + 23689.3545y^6 - 174858.9840y^7 + 695773.9980y^8 - 1154008.6900y^9$.

It appears that with the embodiments as described good results are obtained and that under an angle of 25° the value of the point-spread function is smaller than 2 mrad.

What is claimed is:

1. Device for viewing under water comprising two identical optical lens systems, each of the systems as seen from the object side to the image side consisting of a first component with a concave image-sided surface, an air space and a second component in the form of a lens of positive power, the image-sided nodal point of the first component substantially coinciding with the object-sided nodal point of the second component, the total dioptric power of each of the systems being substantially zero under water characterized in that the optical axes of the optical lens system converge towards the image side and include an angle between 40° and 60° and in that one of the two components of each of the optical lens systems comprises an aspherical surface.

2. Device according to claim 1, characterized in that the optical axes of the optical lens systems include an angle of 50°, the object-sided surface of the second component being aspherical, and in that each of the optical lens systems is determined by the following numerical data, in which the dioptric powers of the refractive surfaces may deviate by ± 5% of the total power,

| Comp. number | Radii of curvature in dm | Axial thickness or separation in dm | Refractive index |
|---|---|---|---|
| I | $r_1=-0.4519$ | | |
| | $r_2=-0.4074$ | $d_1=0.0445$ | $n_d=1.4926$ |
| | | $l_1=0.4074$ | |
| II | $r_{3axis}=-0.7714$ | | |
| | $r_4=\infty$ | $d_2=0.0800$ | $n_d=1.4926$ | the distance X in $10^{-1}$ M parallel to the optical axis between the actual surface and a spherical surface with radius of curvature $r_{3axis}$ on a height $y$ in $10^{-1}$ M for the object-sided surface of the second component being determined by the following equation:

$x = 0.0239y^3 - 1.016y^4 + 13.50y^5 - 20.44y^6 - 663.35y^7 + 2952.92y^8 - 2782.51y^9 + 2325.41y^{10} - 16982.43y^{11}$.

3. Device according to claim 1, characterized in that the optical axes of the optical lens systems include an angle of 50°, the image-sided surface of the first component having a aspherical rim, which rim as measured from the optical axis starts under an angle α = 33° 22'44", and in that each of the optical systems is determined by the following numerical data, in which the dioptric powers of the refractive surfaces may deviate by ± 5% of the total power,

| Comp. number | Radii of curvature in mm | Axial thickness or separation in mm | Refractive index |
|---|---|---|---|
| I | $r_1=-45.19$ | | |
| | $r_{2axis}=-40.74$ | $d_1=4.45$ | $n_d=1.4926$ |
| | | $l_1=40.74$ | |
| II | $r_3=-77.14$ | | |
| | $r_4=\infty$ | $d_2=8.00$ | $n_d=1.4926$ | in which, as measured in a system of orthogonal axes, the x-axis of which coincides with the radius under an angle of 33° 22"44' and the y-axis of which contains the point of intersection of the radius under an angle of 33° 22'44" and the image-sided surface of the first component, the distance $x$ in mm between the asperical rim and the extension of the spherical surface on a height $y$ in mm is determined by the following equation:

$x = -0.6503y^3 + 83.4008y^4 - 1858.7277y^5 + 23689.3545y^6 - 174858.9840y^7 + 695773.9980y^8 - 1154008.6900y^9$.

* * * * *